(12) United States Patent
Ebelsheiser et al.

(10) Patent No.: US 6,732,705 B2
(45) Date of Patent: May 11, 2004

(54) METHOD FOR OPERATING AN INTERNAL COMBUSTION ENGINE

(75) Inventors: Oliver Ebelsheiser, Stuttgart (DE); Alois Raab, Boebingen (DE); Martin Schnabel, Aalen (DE); Martin-Claudio Schuler, Stuttgart (DE); Guenter Wenninger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/309,315

(22) Filed: Dec. 4, 2002

(65) Prior Publication Data

US 2003/0168039 A1 Sep. 11, 2003

(51) Int. Cl.$^7$ .................................................. F02B 3/00
(52) U.S. Cl. ...................................... 123/299; 123/300
(58) Field of Search ................................ 123/299, 300, 123/294, 304, 305; 60/285

(56) References Cited

U.S. PATENT DOCUMENTS

| 5,801,308 | A | * | 9/1998 | Hara ............................ 73/223 |
| 6,112,721 | A | * | 9/2000 | Kouketsu et al. ............ 123/447 |
| 6,378,487 | B1 | * | 4/2002 | Zukouski et al. ............ 123/299 |
| 6,516,773 | B2 | * | 2/2003 | Dutart et al. ................. 123/299 |
| 6,526,939 | B2 | * | 3/2003 | Reitz et al. .................. 123/299 |

FOREIGN PATENT DOCUMENTS

DE  100 11 621 A1  10/2000

* cited by examiner

Primary Examiner—Bibhu Mohanty
(74) Attorney, Agent, or Firm—Crowell & Moring LLP

(57) ABSTRACT

In a method for operating an internal combustion engine with direct fuel injection, the fuel injection includes at least two injections that are carried out at at least two different injection pressures.

13 Claims, 2 Drawing Sheets

METHOD FOR OPERATING AN INTERNAL COMBUSTION ENGINE

This application claims the priority of German patent document 101 59 479.8, filed Dec. 4, 2001, the disclosure of which is expressly incorporated by reference herein.

BACKGROUND AND SUMMARY OF THE INVENTION

The present invention relates to a method for operating an internal combustion engine.

German patent document DE 100 11 621 A1 discloses a method for controlling multiple fuel injections in a diesel engine, in which a quantity of fuel that is to be injected and corresponds to the desired engine output is first predetermined. Thereafter, a portion of the predetermined quantity of fuel is determined for each individual injection operation, and the injection parameters to be used for each individual injection operation are selected. The injection parameters (such as injection time and injection duration) are changed appropriately on the basis of the heat which it is desired to release.

The performance of late afterinjections, in which the afterinjected fuel does not burn or is only partially burned in the combustion chamber of the internal combustion engine, is often used to enrich the exhaust gas with unburned fuel components or other oxidizable constituents. It is also used to generate hot exhaust gas by late combustion in the combustion chamber and as a result to heat the exhaust-gas-purification device to operating temperature. The unburned fuel components can be oxidized in a catalytic converter in the exhaust section. The heat of reaction which is released in the process can also be used to heat exhaust-gas cleaning components to their active temperature range. Furthermore, this technique can be used to heat, for example, a particle filter or a catalytic converter to the temperature required for the regeneration operations.

However, with such afterinjections of fuel there is the problem of minimizing the resultant emission of pollutants, such as soot or hydrocarbons.

Therefore, it an object of the invention to provide a method of fuel injection which is improved in terms of the pollutant emissions.

This and other objects and advantages are achieved by the fuel injection method according to the invention, which includes at least two injections, the at least two injections being carried out at at least two different injection pressures. Each injection may itself in turn comprise a plurality of individual injection operations. By carrying out at least two injections, it is possible to influence the temporal sequence of combustion in the combustion chamber of the internal combustion engine, including both the temporal profile of the torque or the pressure in the cylinder of the internal combustion engine, and the emissions or exhaust-gas composition and temperature.

For this purpose, the quantity of fuel injected per injection, the start of the individual injection operations and the injection pressure are selected appropriately. The torque, the exhaust-gas temperature and the composition of the exhaust gas are dependent, in some cases in a complicated fashion, on i) the number of injections or individual injection operations carried out in one cycle, ii) the start of the injections or individual injection operations, iii) the quantity of fuel which is injected in each case and iv) the injection pressure. As the components and control means used to carry out the fuel injection become increasingly developed, it is possible to optimally utilize the degrees of freedom which result. Accordingly, depending on the particular objective, different fuel injection conditions may be useful and advantageous for the individual injection operations.

According to the invention, the injection pressure of the respective injections is selected to differ, and in this way in particular the exhaust-gas composition and the emission of pollutants are influenced. Extensive tests have confirmed that in particular the emission of hydrocarbons and soot particles can be advantageously influenced by suitable injection time using the inventive technique.

In one embodiment of the invention, the fuel injection includes a main injection and an afterinjection. The fuel which is injected during the main injection is burned virtually completely in the combustion chamber of the internal combustion engine, and consequently it is used mainly to generate the required torque. In the case of an internal combustion engine which is operated in lean-burn mode, such as for example a diesel engine, the main injection is preferably carried out with an injection pressure that is as high as possible and preferably comprises one individual injection operation (although it may include a plurality of individual injection operations). As the injection pressure increases, the homogenization of the air-fuel mix in the combustion chamber improves on account of the better atomization of the fuel. As a result that the emission of soot is reduced.

The afterinjection serves primarily to increase the level of oxidizable constituents in the exhaust gas. For this purpose, the afterinjection is carried out so late that only a small part of the afterinjected fuel burns in the combustion chamber of the internal combustion engine. Depending on the application, the level is increased to a greater or lesser extent by controlling the afterinjection quantity and the afterinjection time. In order, for example, to carry out the regeneration of a nitrogen oxide storage catalytic converter in the exhaust-gas purification device of the internal combustion engine, the afterinjection is preferably configured so that overall a reducing exhaust gas is obtained. To increase the exhaust-gas temperature by subsequent oxidation of the oxidizable exhaust-gas constituents at an exhaust-gas catalytic converter, it is preferable for the level to be increased only until the overall result is an exhaust gas which is still in an oxidizing state.

The afterinjection may itself comprise a plurality of individual injection operations. This allows heating of the exhaust gas as early as in the combustion chamber of the internal combustion engine and, at the same time, allows the level of oxidizable constituents in the exhaust gas to be increased, with subsequent heating by further catalytic oxidation.

In a further embodiment of the invention, the fuel injection includes a preinjection in addition to the main injection and the afterinjection. This preinjection precedes the main injection and is used primarily to make the combustion operation or the associated pressure profile in the combustion chamber more uniform. For this purpose, the preinjection may likewise be divided into a plurality of individual injection operations.

In a further embodiment of the invention, the afterinjection is carried out at an injection pressure which is lower than that of the main injection. The reduction in the injection pressure in the afterinjection compared to the main injection (which is carried out a high injection pressure) prevents the fuel injected in the afterinjection from reaching the cylinder walls and, from there, the lubricating oil of the internal combustion engine. This is significant because, if the afterinjection pressure is too high, there is a risk of the injection jet's coming into contact with the cylinder wall and reducing the lubricating properties of the lubricating oil film or passing into the lubricating oil reservoir and thus diluting the lubricating oil. Both effects reduce the lubricating action of the lubricating oil, which can lead to damage to the engine.

Moreover, it has been determined that, with a reduced afterinjection pressure, it is possible to achieve a more favorable composition of the unburned exhaust-gas components. Depending on the injection pressure, by way of example the long-chain hydrocarbons of a diesel fuel are cracked or partially oxidized. The components which form are more reactive than long-chain hydrocarbons; this has a beneficial effect on the emission of hydrocarbons and, for example, improves the regeneration of a nitrogen oxide storage catalytic converter.

In still another embodiment of the invention, the afterinjection is carried out at an injection pressure which is lower than that of both the main injection and of a preinjection. Preinjection at a high pressure compared to the afterinjection also reduces soot formation, while the afterinjection at a relatively low pressure improves hydrocarbon emission.

In yet another embodiment of the invention, the afterinjection is commenced at a time which corresponds to a crank angle of from 10° to 180° after the top dead center of the piston in the compression stroke. The crank angle specified in this context relates to the cylinder in which the afterinjection is carried out. Therefore, the start of afterinjection takes place in the combustion which is dropping off or has already ended. The afterinjected fuel is mostly partially oxidized, with the release of heat, or thermally cracked, with little or no torque being generated. Particularly as a result of a plurality of individual injection operations during the afterinjection, it is possible to have a targeted influence on the release of heat in the combustion chamber and on the nature and quantity of the oxidizable components with which the exhaust gas is enriched.

According to another feature of the invention, the afterinjection includes a plurality of individual injection operations which are carried out at separate times. This configuration of the invention offers particular advantages if the exhaust-gas purification device includes a catalytic converter that is able to oxidize unburned constituents of the exhaust gas and, in addition, can heat the exhaust gas by exothermic reoxidation in order to release heat in the combustion chamber. The result, therefore, is a greater freedom with regard to the location at which it is desired for heat to be released. For example, to regenerate a catalytically coated particle filter as part of the exhaust-gas purification device, it is possible for some of the increase in temperature which is required for regeneration to be achieved by heating exhaust gas in the combustion chamber by means of a relatively early afterinjection operation, while a further part of the increase in temperature required is achieved by exothermic phenomena being generated in the particle filter itself on account of reoxidation of the reducing agent supplied by a relatively late afterinjection operation.

Finally, according to still another feature of the invention, the individual afterinjection operations of the afterinjection are carried out at different injection pressures. With regard to the composition of the reducing agents emitted by the internal combustion engine and with regard to the introduction of fuel into the lubricating oil, it is in this case particularly advantageous for the injection pressure of the individual injection operation to be reduced further compared to the pressure of the main injection, the later this individual afterinjection operation is carried out.

Other objects, advantages and novel features of the present invention will become apparent from the following detailed description of the invention when considered in conjunction with the accompanying drawings.

DETAILED DESCRIPTION OF THE DRAWINGS

Figure 1:
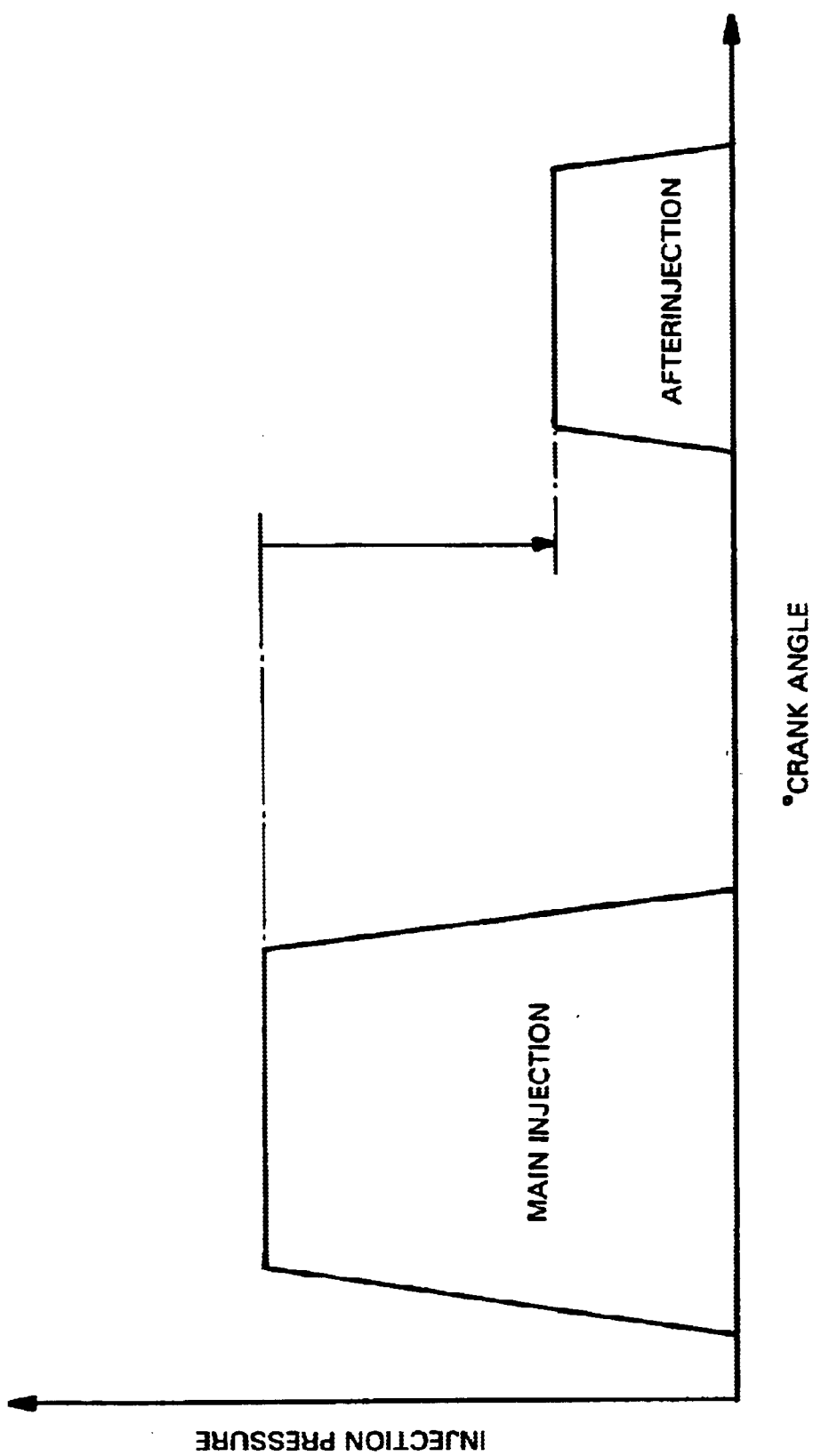
FIG. 1 diagrammatically depicts the time curve of the injection pressure.

The fuel injection pressure curve illustrated in FIG. 1 includes, for example, a main injection and an afterinjection, each comprising one individual injection operation. The injection pressure of the afterinjection is considerably reduced compared to the main injection. It is preferable for the main injection to be carried out at the highest pressure which can be set with the available technology and to be, for example, more than 1000 bar. By contrast, the afterinjection pressure is only a few hundred bar. An approximate lower limit for the afterinjection pressure can be given as approximately 200 bar.

Using the highest possible pressure for the main injection lowers the levels of soot emissions, particularly when small injection nozzle apertures are used, because the fuel is atomized more finely and therefore clean combustion is achieved. The reduction in the injection pressure for the afterinjection, by contrast, prevents the jet of fuel from striking the cylinder wall and as a result diluting the lubricating oil. In addition, the emission of hydrocarbons is avoided due to an advantageous preparation of the afterinjected fuel with regard to the objective pursued (generating reactive, unburned exhaust-gas constituents).

In one example in this context, the internal combustion engine is designed as a diesel engine which has an exhaust-gas purification device with a nitrogen oxide storage catalytic converter, that can remove nitrogen oxides from the exhaust gas, even when the internal combustion engine is operated in predominantly lean-burn mode (as is customary with a diesel engine). For this purpose, the barium carbonate that is present, for example, in the catalytic material of the nitrogen oxide storage catalytic converter, when the internal combustion engine is operating in lean-burn mode, extracts nitrogen oxides (NOx) from the exhaust gas (which is then an oxidizing exhaust gas) to form solid barium nitrate.

As a result of the associated depletion of the material, from time to time it is necessary to regenerate the NOx storage catalytic converter. This so-called nitrate regeneration is brought about by enriching the exhaust gas, with the aid of a late fuel afterinjection, with unburned fuel constituents which have a reducing action, in such a way that the overall result is an exhaust gas with a reducing action. Under these conditions, the barium nitrate formed is chemically unstable and decomposes again to form barium carbonate and release NOx. The NOx are predominantly reduced to harmless nitrogen (N2) by the reducing agents (H2, CO and HC) which are then present in the exhaust gas at the precious-metal component which has been applied to the NOx storage catalytic converter.

The provision of suitable reducing agents is particularly significant especially at low exhaust-gas temperatures. Particularly at low exhaust-gas temperatures, to carry out successful nitrate regeneration, it is important to provide reactive reducing exhaust-gas constituents, on the one hand, for rapid and as far as possible complete nitrate regeneration, and on the other hand to avoid pollutant emissions (for example due to incompletely reacted hydrocarbons). For example, if afterinjected fuel is prepared only to an insufficient extent as a result of unfavorable afterinjection conditions, the reducing exhaust-gas constituents substantially comprise the long-chain hydrocarbon molecules of the diesel fuel, which are relatively unsuitable for nitrate regeneration and manifest themselves as the emission of white smoke in the exhaust gas. Lowering the injection pressure according to the invention, during the afterinjection compared to the main injection has proven particularly advantageous with regard to effective and emission-free nitrate regeneration.

If the afterinjection for nitrate regeneration is divided into a plurality of individual injection operations, it is possible, by reducing the injection pressure, simultaneously both to increase the exhaust-gas temperature (mainly by relatively early afterinjection with heat being released in the combustion chamber of the internal combustion engine) and to provide reactive reducing agents for effective, emission-free nitrate regeneration (mainly by means of relatively late afterinjection).

It is particularly important to avoid emissions, such as for example white smoke resulting from afterinjection of fuel, if relatively large quantities of fuel are afterinjected in order to greatly increase the temperature of the exhaust gas. This is necessary, for example, if the nitrogen oxide storage catalytic converter arranged in the exhaust-gas purification device in the example described above is subjected to a sulfate regeneration. This is required whenever the nitrogen oxide storage capacity of the nitrogen oxide storage catalytic converter has been excessively impaired by the accumulation of sulfur which is present in the exhaust gas when sulfur-containing fuel is being burnt. The removal of the sulfur which has accumulated in the form of chemically stable sulfates (i.e., the sulfate regeneration), however, simultaneously requires a high exhaust-gas or catalytic converter temperature of approx. 650° C. and at least a temporary reduction of the exhaust-gas composition. This can be achieved by the afterinjection of relatively large quantities of fuel, with a correspondingly increased risk of an unacceptably high emission of pollutants.

The reduction in the injection pressure according to the invention during the afterinjection compared to the main injection has also proven particularly advantageous with a view to carrying out effective, emission-free sulfate regeneration.

In a further application example, the internal combustion engine is designed as a diesel engine which includes an exhaust-gas purification device with a particle filter. Particularly in the case of diesel engines, it is important to remove particles as well as nitrogen oxides from the exhaust gas. For this purpose, various particle filters are arranged in the exhaust-gas purification system. Such particle filters usually also have to be regenerated from time to time, in order to remove accumulated particles (typically in the form of soot). To regenerate the particle filters, it is likewise necessary to set an elevated temperature of, for example, over 550° C. in the exhaust gas or particle filter. In the case of an oxidizing exhaust gas, the soot deposits are burned off, so that the particle filter is regenerated.

To achieve the high temperatures required, for example, the exhaust gas is on the one hand heated directly by establishing exothermic conditions in the combustion chamber, and on the other hand the exhaust gas is enriched with unburned constituents, for example by means of an afterinjection of fuel, which may include a plurality of individual afterinjection operations. However, overall an exhaust gas which is still an oxidizing gas with an excess of oxygen is established. Therefore, the unburned constituents can be oxidized in a catalytic converter which is connected upstream of the particle filter or on the particle filter itself, with heat of reaction being released, resulting in a further increase in the temperature.

On account of the relatively large afterinjection quantities, in this case too it is particularly important to avoid emissions, such as for example white smoke.

The reduction in the injection pressure according to the invention during the afterinjection compared to the main injection has also proven particularly advantageous when carrying out effective, emission-free particle filter regeneration.

Of course, to achieve uniform, low-pollutant combustion, in addition to dividing the afterinjection into a plurality of individual injection operations, it may also be advantageous to divide the main injection and the preinjection into a plurality of individual injection operations. The individual injection operations of an injection may themselves in turn be carried out at different pressures. According to the invention, however, in these cases too the afterinjection is carried out at an injection pressure lower than that of the main injection.

Figure 2:
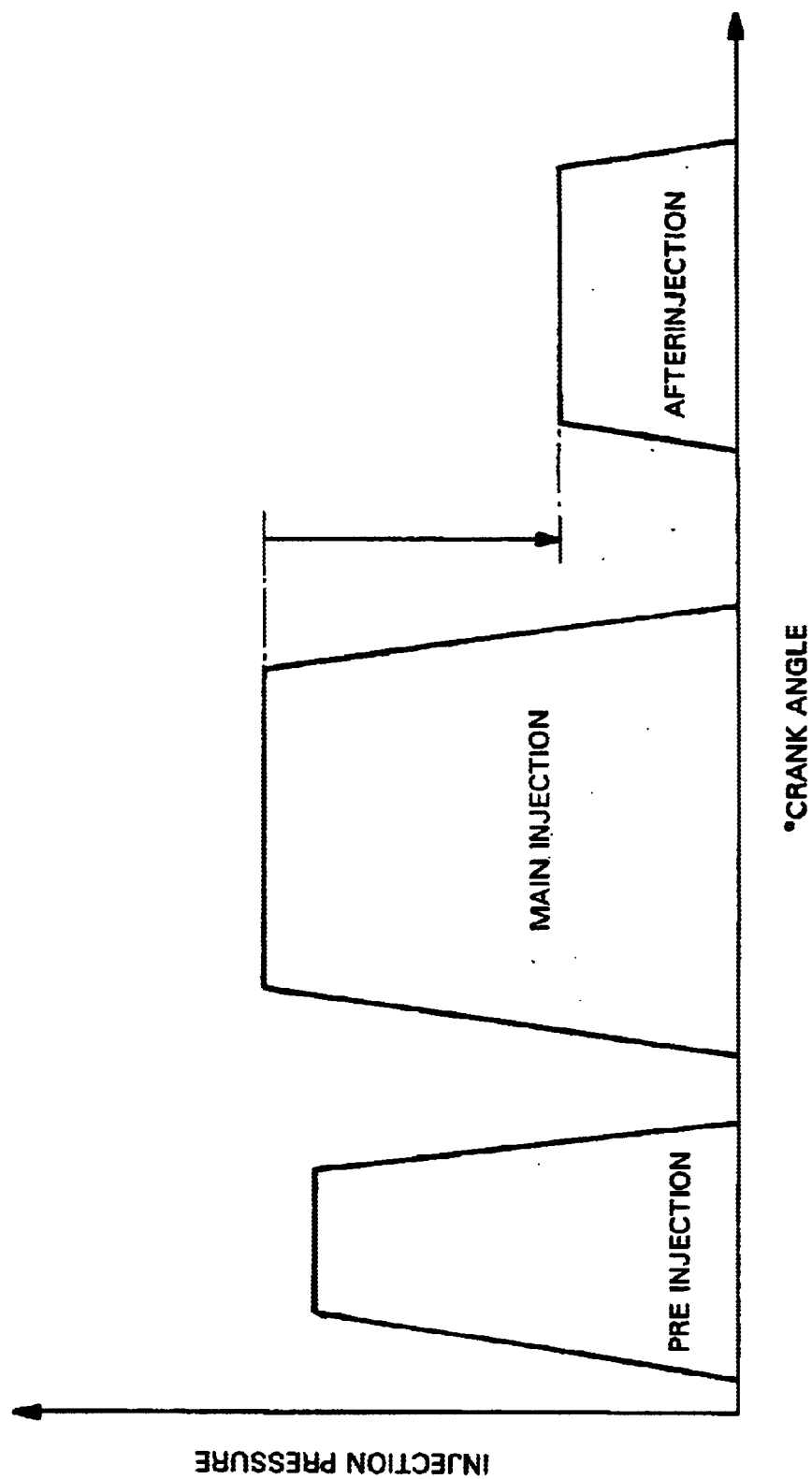
FIG. 2 illustrates another example of an injection pressure curve.

It will be understood that the afterinjection, which is carried out at a lower injection pressure than that of the main injection or the preinjection (FIG. 2), may if necessary be carried out with the omission of some working cycles and does not have to be carried out in all the cylinders of a multicylinder internal combustion engine. Rather, depending on requirements, the cylinders in which afterinjection is carried out may be changed cyclically, or in addition or at the same time the frequency of afterinjections may be dependent on time in a manner which is linked, for example, to a temperature curve of an exhaust-gas purification component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an internal combustion engine with direct fuel injection, said method comprising:

dividing a fuel injection cycle into at least two injections; and performing the at least two injections at at least two different injection pressures;

wherein the fuel injection includes a main injection and an afterinjection, which occurs after the main injection; and wherein the afterinjection is carried out at an injection pressure which is lower than that of the main injection.

2. A method for operating an internal combustion engine with direct fuel injection, said method comprising:

dividing a fuel injection cycle into at least two injections; and performing the at least two injections at at least two different injection pressures;

wherein the fuel injection includes a preinjection, which occurs before the main injection, a main injection and an afterinjection, which occurs after the main injection wherein the afterinjection is carried out at an injection pressure which is lower than that of the main injection.

3. The method according to claim 2, wherein the afterinjection is carried out at an injection pressure which is lower than that of the main injection and of the preinjection.

4. The method according to claim 1, wherein the afterinjection is commenced at a time which corresponds to a crank angle of from 10° to 180° after the top dead center of the piston in the compression stroke.

5. The method according to claim 1, wherein the afterinjection includes a plurality of individual injection operations.

6. The method according to claim 5, wherein the individual injection operations of the afterinjection are carried out at different injection pressures.

7. A method for injecting fuel into an internal combustion engine, comprising:

during a fuel injection cycle of said engine, performing a main fuel injection;

during the same fuel injection cycle, performing an afterinjection, which occurs subsequent to said main fuel injection, and which is carried out at an injection pressure that is lower than an injection pressure of said main fuel injection.

8. The method according to claim 7, wherein said main fuel injection includes injection of a quantity of fuel sufficient to generate a desired torque.

9. The method according to claim 7, wherein said afterinjection is separated in time from said main fuel injection.

10. The method according to claim 8, wherein said afterinjection is separated in time from said main fuel injection.

11. The method according to claim 7, wherein the afterinjection includes a plurality of individual injection operations.

12. The method according to claim 11, wherein the individual injection operations of the afterinjection are carried out at different injection pressures.

13. The method according to claim 7, wherein pressure in the main injection is greater than 1000 bar, and pressure in the afterinjection is less than 1000 bar and greater than approximately 200 bar.

* * * * *